(12) United States Patent
Belur

(10) Patent No.: US 9,992,668 B2
(45) Date of Patent: Jun. 5, 2018

(54) WIRELESS CALL SECURITY

(71) Applicant: Harman International Industries, Incorporated, Stamford, CT (US)

(72) Inventor: Srinivasa Belur, Bengaluru (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days. days.

(21) Appl. No.: 14/604,535

(22) Filed: Jan. 23, 2015

(65) Prior Publication Data

US 2016/0219431 A1 Jul. 28, 2016

(51) Int. Cl.
*H04W 12/08* (2009.01)
*H04W 12/02* (2009.01)
*H04M 1/60* (2006.01)

(52) U.S. Cl.
CPC ......... *H04W 12/02* (2013.01); *H04M 1/6075* (2013.01); *H04M 1/6091* (2013.01)

(58) Field of Classification Search
CPC .... B60R 25/305; H04R 1/08; H04R 2201/40; H04R 5/02; H04R 3/005; H04R 3/12; H04M 1/6083; H04L 63/0861
USPC ...... 455/410, 456.6, 574; 701/427; 370/352; 342/357.51; 381/86; 340/572.1, 439
See application file for complete search history.

(56) References Cited

U.S. PATENT DOCUMENTS

| | | | |
|---|---|---|---|
| 4,916,729 A * | 4/1990 | Usui | H04W 52/0254 455/127.1 |
| 8,731,475 B1 | 5/2014 | Youngs et al. | |
| 2007/0280486 A1 | 12/2007 | Markus et al. | |
| 2008/0112575 A1* | 5/2008 | Isobe | H03G 3/3026 381/104 |
| 2009/0146813 A1* | 6/2009 | Nuno | G08B 21/22 340/572.1 |
| 2012/0059579 A1* | 3/2012 | Pierfelice | G10L 15/26 701/427 |
| 2013/0141228 A1* | 6/2013 | Nagda | G08G 1/205 340/439 |
| 2014/0067403 A1* | 3/2014 | Burke | G10L 15/22 704/275 |
| 2014/0327752 A1 | 11/2014 | Tsuda | |
| 2015/0350758 A1* | 12/2015 | Zhao | H04R 1/08 381/86 |

FOREIGN PATENT DOCUMENTS

| | | |
|---|---|---|
| EP | 2574024 A1 | 3/2013 |
| WO | 2012/048416 A2 | 4/2012 |

OTHER PUBLICATIONS

Extended European Search Report Application No. 1615223.1 dated May 23, 2016, 7 pages.

* cited by examiner

*Primary Examiner* — Phuoc H Doan
(74) *Attorney, Agent, or Firm* — Artegis Law Group, LLP

(57) ABSTRACT

Systems, methods, and computer program products to perform an operation comprising establishing a telephone call between a local mobile telephone and a remote telephone via an audio system in a vehicle, wherein the telephone call is audible through a set of speakers connected to the audio system in the vehicle, and responsive to the telephone call, determining that more than one person is present in the vehicle, and sending, to the remote telephone, an indication that more than one person is present in the vehicle.

17 Claims, 4 Drawing Sheets

WIRELESS CALL SECURITY

BACKGROUND

The present disclosure relates to telephone calls, and more specifically, call security.

When a user pairs a telephone via Bluetooth® or other wireless technology in a vehicle, the user is able to use "hands-free" calling, where the user does not need to hold the telephone to their ear and mouth to hear or speak. Instead, a separate microphone and set of speakers are used for telephone calls. However, in many cases, other people may be in the vehicle, and are able to hear the conversation in full.

SUMMARY

Aspects disclosed herein include systems, methods, and computer program products to perform an operation establishing a telephone call between a local mobile telephone and a remote telephone via an audio system in a vehicle, wherein the telephone call is audible through a set of speakers connected to the audio system in the vehicle, and responsive to the telephone call, determining that more than one person is present in the vehicle, and sending, to the remote telephone, an indication that more than one person is present in the vehicle.

DETAILED DESCRIPTION

Aspects disclosed herein provide techniques to enhance call security within a defined listening area, such as within vehicles. Specifically, aspects disclosed herein determine a number of people in a defined area at the time a call is placed or received by a telephony device wirelessly connected to an audio/video system. If more than one person is in the area (i.e., another person in addition to the party to the call in the area), aspects disclosed herein may send a privacy notification to the call participant not in the listening area (the "other party") in order to inform the other party that other people are in the listening area, and they may hear anything the other party says. The privacy notification may be textual, such as a text message, SMS message, MMS message, email, and the like. In such a case, the text message may be sent prior to connecting the call to the A/V system. The privacy notification may also be a prerecorded audio notification stating that more than one person is present in the listening area. In such a case, the call may be connected to the vehicle's A/V system, but the vehicle's microphone and speakers may be muted while the message is being played. Providing the privacy notification may allow the other party to modify their conversation in light of the additional people in the vehicle (and possibly lessened privacy).

Figure 1:
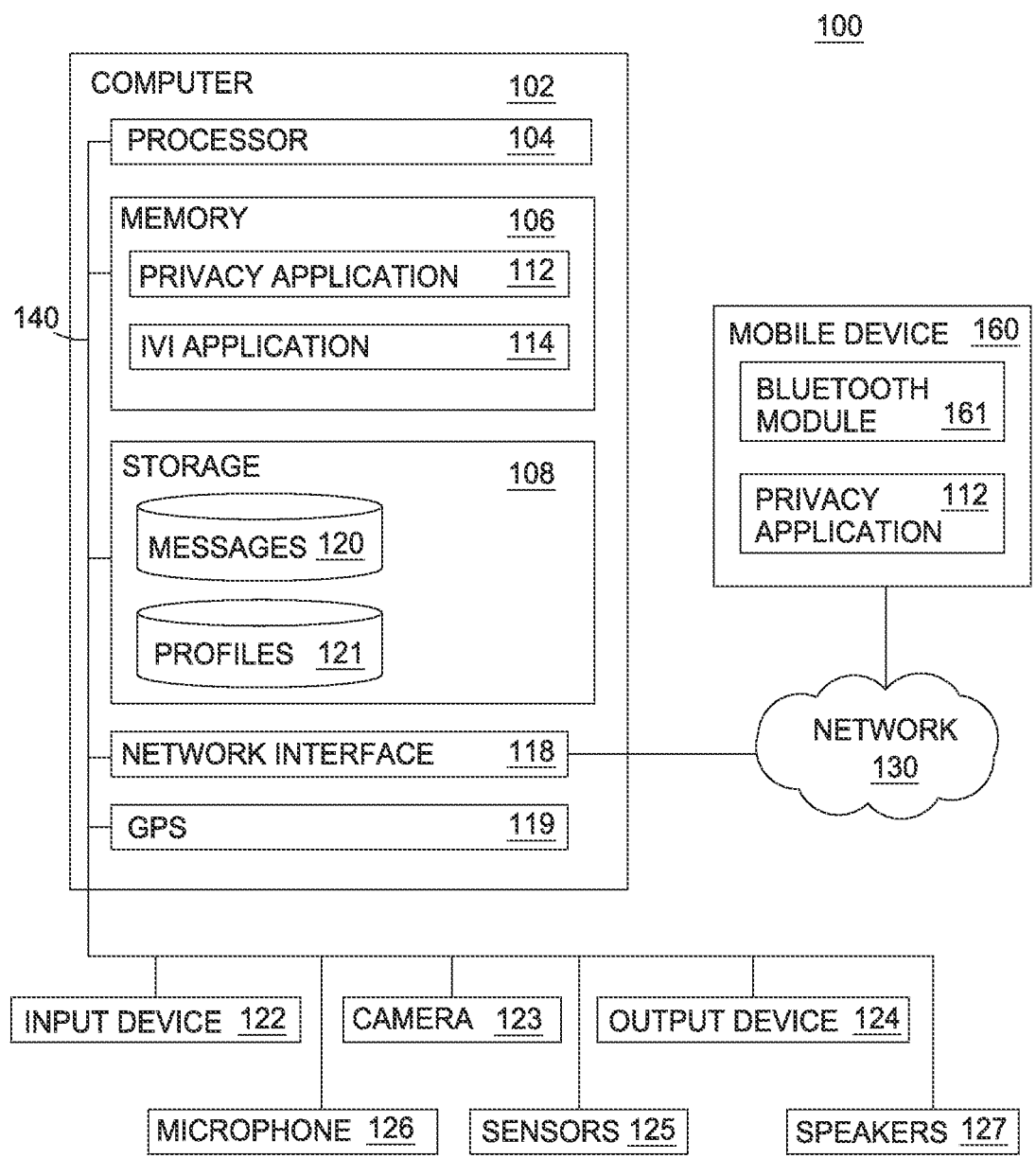
FIG. 1 is a block diagram illustrating a system to provide wireless call security, according to one aspect.

FIG. 1 is a block diagram illustrating a system 100 to provide wireless call security, according to one aspect. The networked system 100 includes a computer 102. The computer 102 may also be connected to other computers via a network 130. In general, the network 130 may be a telecommunications network and/or a wide area network (WAN). In a particular embodiment, the network 130 is the Internet. In at least one aspect, the computer 102 is part of an in-vehicle infotainment (IVI) system configured to provide a range of functionality, including without limitation, hands-free calling for a mobile device 160, media playback, a navigation system, and the like. The vehicle (not pictured) may be any vehicle, such as a car, truck, bus, or van.

It is noted that while aspects of the invention will be described in the context of vehicles for purposes of illustration, the invention is not limited to vehicles. Rather, call security according to the present disclosure can be provided in a listening area. The listening area is generally that region in which a call being output by one or more speakers may be heard by participants to the call or nonparticipants. Thus, the listening area may, for example, be defined by a distance from speakers outputting the call transmission. The defined distance may be fixed, or may be varied according to the volume setting of the system to which the speakers are connected. As the volume is increased the listening area is increased.

The computer 102 generally includes a processor 104 connected via a bus 140 to a memory 106, a network interface device 118, a storage 108, an input device 122, and an output device 124. The computer 102 is generally under the control of an operating system (not shown). Examples of operating systems include the UNIX operating system, versions of the Microsoft® Windows® operating system, and distributions of the Linux® operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like.

The storage 108 may be a persistent storage device. Although the storage 108 is shown as a single unit, the storage 108 may be a combination of fixed and/or removable storage devices, such as fixed disc drives, solid state drives, SAN storage, NAS storage, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

The network interface device 118 may be any type of network communications device allowing the computer 102 to communicate with other computers via the network 130. In at least one aspect, the network interface device 118 is a Bluetooth® module configured to provide wireless data transmissions according to the Bluetooth® specification.

The Bluetooth® module may be configured to connect devices, such as the mobile device 160, to a vehicle's audio/video system, such that a user can engage in hands-free calls. The hands-free calls allow the user to speak into a microphone in the vehicle, and hear audio from the other party of a telephone call through the speakers in the vehicle.

The global positioning system (GPS) 119 is a module configured to track the location of the vehicle using GPS technology. The camera 123 comprises one or more cameras positioned within the vehicle in order to capture images of the vehicle's interior. In at least one aspect, the privacy application 112 may analyze images captured by the camera 123 in order to detect the presence of people in the vehicle. The sensors 125 are a plurality of different sensors in a vehicle, such as individual seat belt sensors which determine whether a given seat belt is engaged (or fastened), door sensors which identify when a door is opened or closed, scales or other devices which measures a weight in the seats of the vehicle, and the like. The microphone 126 may be any audio capture device. The speakers 127 may be configured to output sound in the vehicle.

As shown, the memory 106 includes the privacy application 112 and the in-vehicle infotainment (IVI) application 114. As previously discussed, the IVI application 114 is part of an IVI system configured to provide a range of functionality, including without limitation, hands-free calling for a mobile device 160, media playback, a navigation system, and the like. In at least one aspect, the functionality of the privacy application 112 is integrated into the IVI application 114. The privacy application 112 is an application generally configured to notify a party to a telephone call that the other party is in a vehicle with more than one person, to preserve privacy in the telephone call. For example, user X may be in a vehicle with three other people when user Y calls user X. The privacy application 112 may determine that more than one person is in the vehicle, and send user Y a text message stating that user X is in a vehicle with other people prior to connecting the call. Similarly, the privacy application 112 may mute the speakers and microphone in the vehicle while playing a prerecorded message to user Y. The prerecorded message may also state that user X is in a vehicle with other people. Once the prerecorded message is played, the privacy application 112 may unmute the speakers and microphone, and the call may continue as normal. Similarly, if user X calls user Y, the text or audio privacy notification may be provided to user Y before the call is connected (or provide an audio notification with muted speakers/microphone as described above). In at least one aspect, the privacy application 112 may ignore (or reject) an incoming call such that a privacy message (voice or text) is sent to the caller, but the call is not connected in the vehicle.

The privacy application 112 may determine the number of people in a car based on any number of techniques. For example, the privacy application 112 may analyze image data from the camera 123 to identify how many people are present in the image data (such as by facial analysis or other techniques). Similarly, the privacy application 112 may use sensor data from one of the sensors 125 to determine that more than one person is in the vehicle. The sensor data from the sensors 125 may indicate, for example, that all four doors were opened and closed prior to the vehicle being started. The sensors 125 may also indicate that objects having a weight greater than a specified threshold (such as 20 pounds) are seated in more than one seat of the vehicle. The sensors 125 may also indicate that 3 seat belts are fastened in the vehicle, indicating that at least three people are in the vehicle. Still further, the privacy application 112 may detect multiple wireless devices in the vehicle. For example, the privacy application 112 may identify wireless data signals of sufficient strength, indicating the wireless device is within the vehicle. In still further aspects, mobile devices may be configured to send an identification beacon to the privacy application 112 or the IVI 114. As such, the privacy application 112 or the IVI 114 may perform a proprietary "roll call" in order to determine the identity of the people in the vehicle, such as when people enter the car, when a call is placed or received, or when the car is started. The privacy application 112 may then provide the identity of the non-participant listeners in the vehicle to the remote participant (such as via a text or speech-based identification information, photographs, and the like). In such aspects, the remote call participants may have knowledge of the identities of the other people in the vehicle. In some aspects, the privacy application 112 may leverage multiple attributes (such as camera data, number of seat belts fastened, and number of doors opened) in order to determine how many people are in the vehicle. Upon determining that more than one person is in the vehicle, the privacy application 112 may store an indication to this effect in the memory 106 or the storage 108.

In addition, the privacy application 112 may include different metadata about the vehicle or the user in the privacy notification. For example, the privacy application 112 may include information about the vehicle's current speed, destination, departure time, arrival time, time to destination, current location, route being traveled, and the like. The privacy application 112 may receive this metadata from the vehicle's IVI 114, or other components in the vehicle (such as the GPS 119, speedometer (not pictured), etc).

The mobile device 160 may be any device configured to place and receive telephone calls, including, without limitation smartphones, tablets, and other mobile computing devices. The mobile device 160 may place and receive telephone calls via any interface, such as a cellular network connection, a wireless data connection, and the like. In at least one aspect, the mobile device 160 includes a Bluetooth® module 161 which allows the mobile device 160 to utilize the hands-free functionality provided by the privacy application 112 and/or IVI application 114. Generally, in aspects of the disclosure, the privacy application 112 and/or IVI application 114 coexist with existing technology to provide hands-free calling in vehicles. In at least one aspect, the mobile device executes an instance of the privacy application 112, and may send privacy messages to other parties to telephone calls. In such aspects, the instances of the privacy application 112 in the mobile device 160 and on the computer 102 may interact to detect the number of passengers in the vehicle and send privacy messages when more than one passenger is in the vehicle as described herein.

As shown, the storage 108 includes the messages 120 and profiles 121. The messages 120 include standard audio and textual messages sent by the privacy application 112 to inform parties to a telephone call that one party is in a vehicle with other people, and the other people in the vehicle may hear the conversation. The profiles 121 may include a plurality of user profiles, which may include custom text or audio messages generated by each user. For example, user X may record a message in his own voice indicating he is in the vehicle with other people, and that the party should be cognizant of what they say, because the other people will hear what is spoken. The profiles 121 may also include preference data, such as which format of privacy notification the privacy application 112 should send to another user. For example, user X may specify that the privacy application 112 should send a text message notification to user Y, a first recorded audio message to user Z, and a second recorded audio message to user A. Similarly, user W may indicate that the privacy application 112 should always mute the speakers/microphones in the vehicle and play an audio privacy notification, regardless of the identity of the other party to the call. Additionally, the profiles 121 may specify whether a user wishes to include vehicle metadata in the privacy notifications, and if so, what types of metadata. For example, user X may request that the privacy application 112 include what time user X left his origin point, an estimated time of arrival at home, and the vehicle's current speed in the privacy notification when family members call. The profiles 121 may also indicate whether a user wishes to send privacy notifications via the privacy application 112, allowing the user to opt-in or opt-out of the functionality provided by the privacy application 112. In at least one aspect, the mobile device 160 includes instances of the messages 120 and profiles 121.

As previously described, the instance of the privacy application 112 executing on the mobile device 160 may provide privacy messages outside of vehicles. For example, if the mobile device 160 is paired to a telephone in a conference room, the privacy application 112 may leverage a camera in the conference room (or a camera on the mobile device 160), in order to determine whether more than one person is in the conference room. If more than one person is in the conference room when the mobile device 160 places or receives a telephone call, the privacy application 112 may provide a privacy message to the party on the other end of the telephone call indicating that there are other people who may hear the conversation.

Figure 2:
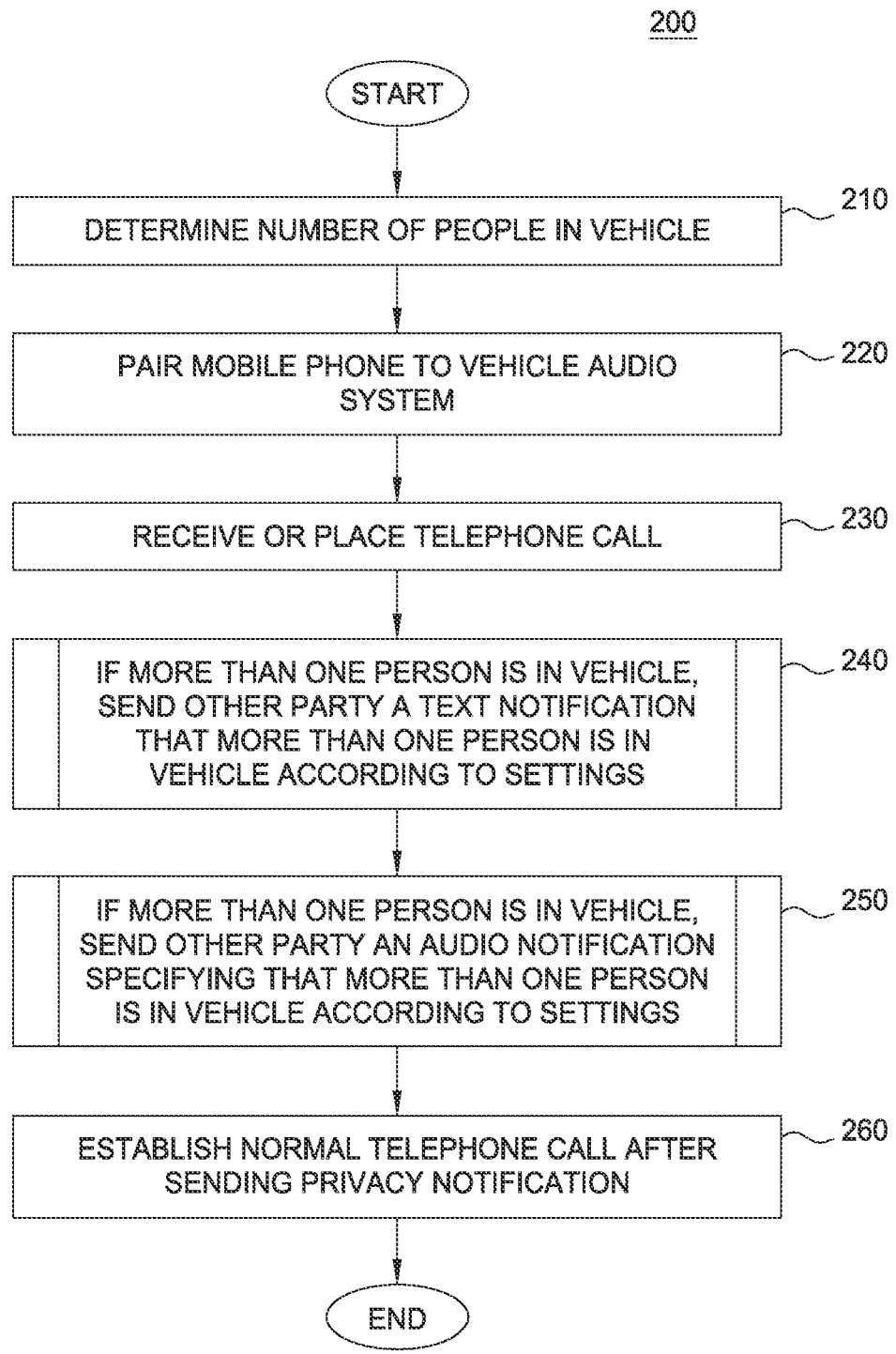
FIG. 2 is a flow chart illustrating a method to provide wireless call security, according to one aspect.

FIG. 2 is a flow chart illustrating a method 200 to provide wireless call security, according to one aspect. Generally, the steps of the method 200 notify callers (or call recipients) that a participant of a telephone call is in a vehicle with other people. In at least one aspect, the privacy application 112 performs the steps of the method 200. At step 210, the privacy application 112 may determine the number of people in the vehicle. As described above, the privacy application 112 may determine the number of people based on image analysis, a number of fastened seatbelts, a number of seats having a weight exceeding an occupant threshold seated in them, a number of doors which were opened prior to the car being driven, and the like. In at least one aspect, the privacy application 112 may consider more than one factor in order to determine how many people are in the vehicle. For example, one seat belt may be fastened, while three seats are registering weights greater than the occupant threshold. In such a case, the privacy application 112 may determine that three people are in the vehicle. When the privacy application 112 determines how many people are in the car, the privacy application 112 may store an indication as to whether more than one person is in the car. In some embodiments, however, the privacy application 112 may determine whether more than one person is in the car each time a call is placed or received.

At step 220, a user may pair a mobile phone to the vehicle audio system, such as the IVI application 114. At step 230, the user may place a call, or receive a telephone call from another user (the "other party"). At step 240, described in greater detail with reference to FIG. 3, the privacy application 112 may send an audio privacy notification to the other party to the call if more than one person is in the vehicle. For example, the privacy application 112 may play a system standard recording which states that the call participant in the vehicle is with other people, and that the remote party (not in the vehicle) should be cautious as to what they say, as the other people will hear what they say. As another example, if user X calls user Y, and user Y is in the vehicle, the privacy application 112 in user Y's vehicle may send user X a text message which reads "User Y is in a vehicle with other people. User Y's phone is connected to his vehicle's hands-free system. Speak with caution."

At step 250, described in greater detail with reference to FIG. 4, the privacy application 112 may send a textual privacy notification to the other party to the call if more than one person is in the vehicle. For example, if user X calls user Y, and user Y is in the vehicle, the privacy application 112 may play an audio message which states "User Y is in a vehicle with other people. User Y's phone is connected to his vehicle's hands-free system. Anything you say will be heard by the other people in the vehicle." Although depicted as sending both a text and an audio message at steps 240 and 250, respectively, the privacy application 112 may only send one message, either audio or text. The privacy application 112 may base the decision by referencing settings in the user profiles 121. If the user profiles do not specify a preference, the privacy application 112 may select a text or audio message at random or according to a round-robin scheme. As another aspect, the privacy application 112 may default to one of text or audio messages. At step 260, the telephone call may proceed as normal after the privacy application 112 sends the privacy notification to the party to the call that is not in the vehicle.

Figure 3:
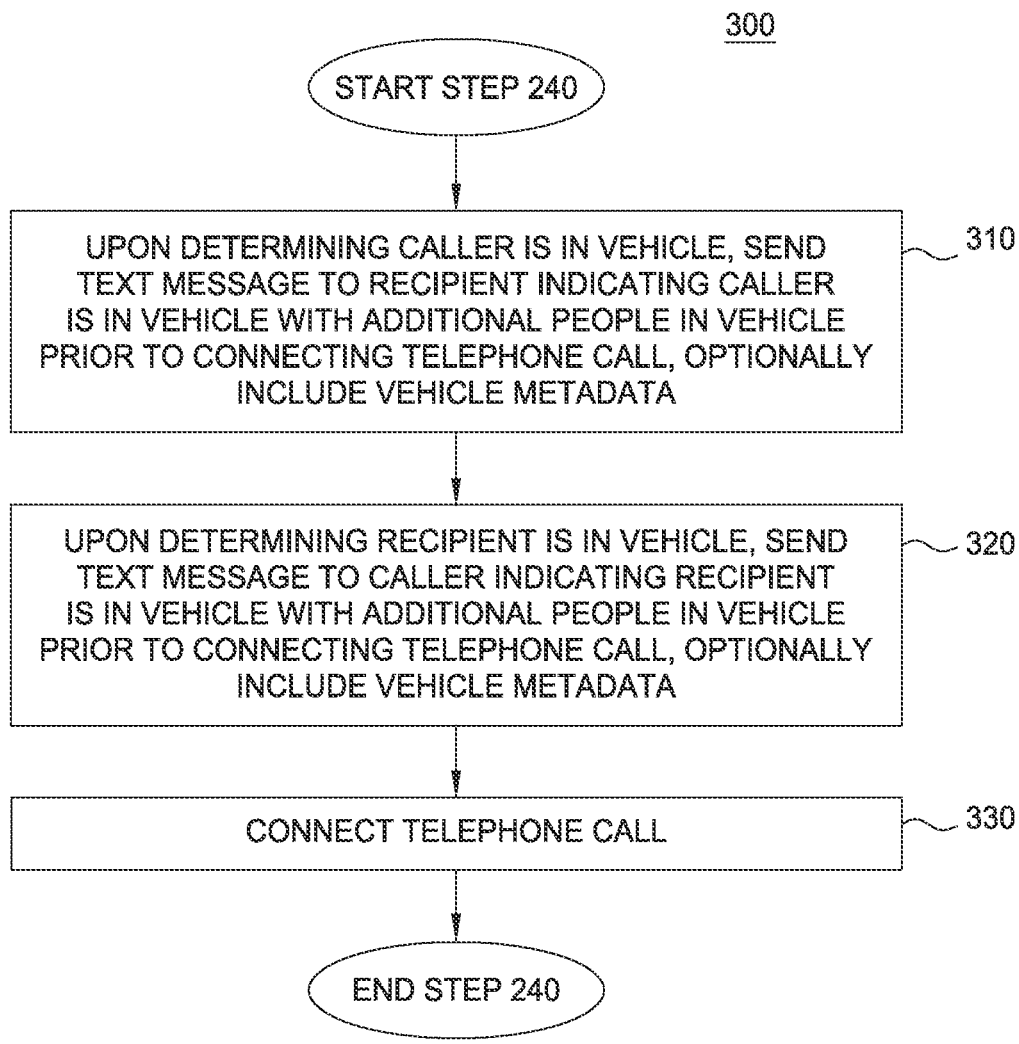
FIG. 3 is a flow chart illustrating a method to send a party to a telephone call a text notification that more than one person is in a vehicle, according to one aspect.

FIG. 3 is a flow chart illustrating a method 300 corresponding to step 240 to send a party to a telephone call an audio notification that more than one person is in a vehicle, according to one aspect. In at least one aspect, the privacy application 112 and/or the WI application 114 may perform the steps of the method 300 in order to provide a text privacy notification to a party to a call indicating that the other party to the call is in a vehicle with other people who may hear the conversation. At step 310, the privacy application 112 may, upon determining that the caller (the person placing the telephone call) is in the vehicle with additional people, send a text message to the recipient's telephone number indicating that the caller is in the vehicle prior to connecting the telephone call. Step 310 covers the aspect where the caller is in the vehicle with other people. In lieu of sending a text message, the privacy application 112 may instead send an email to the recipient (if the recipient's email address is in the user's profile 121 or a contact entry in the caller's phone). In addition, the privacy application 112 may include vehicle metadata in the text message sent at step 310, as well as any available identification information (such as names or photos) about the other people in the vehicle.

At step 320, the privacy application 112 may, upon determining that the recipient of the telephone call is in the vehicle with additional people, send a text message to the caller's telephone number indicating that the recipient is in the vehicle prior to connecting the telephone call. Step 320 covers the aspect where a person outside of the vehicle calls a recipient who is in the vehicle with other people. In lieu of sending a text message, the privacy application 112 may instead send an email to the caller (if the caller's email address is in the user's profile 121 or a contact entry in the recipient's phone). In addition, the privacy application 112 may include vehicle metadata in the text message sent at step 320, as well as any available identification information (such as names or photos) about the other people in the vehicle. At step 330, the privacy application 112 may connect the telephone call and allow the call to proceed as normal.

Figure 4:
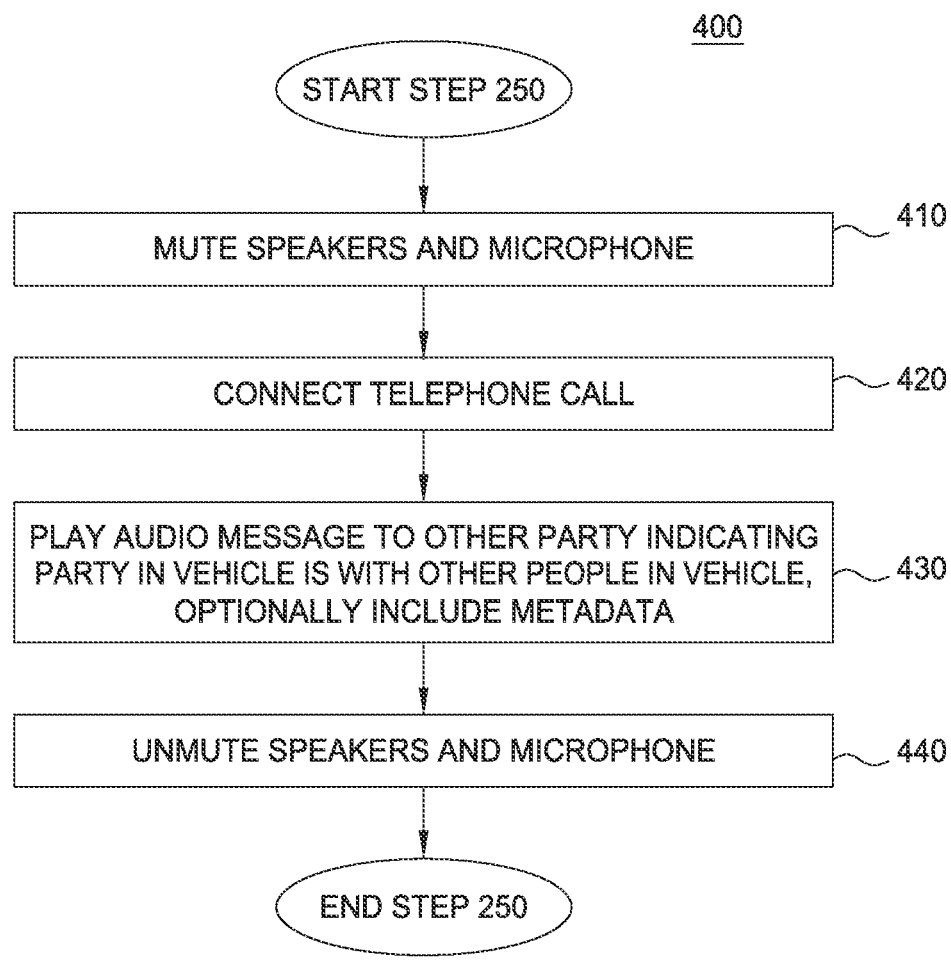
FIG. 4 is a flow chart illustrating a method to send a party to a telephone call an audio notification that more than one person is in a vehicle, according to one aspect.

FIG. 4 is a flow chart illustrating a method 400 corresponding to step 250 to send a party to a telephone call an audio notification that more than one person is in a vehicle, according to one aspect. Generally, the privacy application 112 and/or the IVI application 114 may perform the steps of the method 400 to play a recorded audio message to a party to the call indicating that the other party is in the vehicle with other people. At step 410, the privacy application 112 may mute the speakers and microphone in the vehicle. At step 420, the privacy application 112 may connect the telephone call. At step 430, the privacy application 112 may play an audio privacy message to the other party. The audio privacy message may indicate that the other party is with other people in the vehicle. The audio privacy message may also include metadata such as the vehicle's current speed, location, identification information for the other people in the vehicle, and the like. At step 440, the privacy application 112 may cause the speakers and microphone in the vehicle to be unmuted, so that the call may proceed as normal.

In addition to sending privacy notifications to parties to the telephone call, the privacy application 112 may notify a cellular network provider that the user is in a vehicle (and possibly with additional people in the vehicle). In such a case, the cell phone network may directly route messages and other notifications to the people who are trying to call users in the vehicle. For example, if user X is driving in his vehicle at 65 miles per hour, the cellular phone network may provide a notification indicating "user X is driving at 65 miles per hour, do you want to proceed with the call, or can we alert you when user X's speed reaches 30 miles per hour?" Similarly, the notification may specify that the caller may be notified by the network when user X reaches his destination. In addition, the cellular network itself may notify the caller (or recipient) that there are multiple people in the vehicle, as described in detail with reference to the privacy application 112 above.

Advantageously, aspects disclosed herein facilitate telephone call privacy when users place or receive telephone calls in a vehicle when other people present in the vehicle. By providing privacy notifications to the remote parties to a call, that party can adjust their conversation in order to preserve privacy, confidentiality, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the privacy application 112 could execute on a computing system in the cloud and provide privacy notifications indicating that a party to a telephone call is in a vehicle with other people who may hear the call. In such a case, the privacy application 112 could store user-generated voice or text privacy notifications in a user profile at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   establishing a telephone call between a local mobile telephone and a remote telephone via an audio system in a vehicle, wherein the telephone call is audible through a set of speakers connected to the audio system in the vehicle; and
   responsive to the telephone call:
      determining that more than one person is present in the vehicle; and
      causing an audio recording to be sent to the remote telephone indicating that more than one person is present in the vehicle.

2. The method of claim 1, wherein determining that more than one person is present in the vehicle comprises at least one of: (i) determining that more than one person is present in a set of images captured by a camera in the vehicle, (ii) determining that more than one seat belt in the vehicle is fastened, and (iii) determining that a respective weight of more than one seat in the vehicle exceeds a predefined threshold.

3. The method of claim 1, wherein the indication further specifies a metadata attribute.

4. The method of claim 3, wherein the metadata attribute comprises at least one of: (i) a speed of the vehicle, (ii) a destination of the vehicle, (iii) a planned route of the vehicle, (iv) identification information of at least one of the more than one person in the vehicle, and (v) a distance of the vehicle from the destination.

5. The method of claim 1, wherein the indication comprises an audio message recorded by a user and stored in the audio system.

6. A system, comprising:
a processor; and
a memory containing a program, which when executed by the processor, performs an operation comprising:
establishing a telephone call between a local mobile telephone and a remote telephone via an audio system in a vehicle, wherein the telephone call is audible through a set of speakers connected to the audio system in the vehicle; and
responsive to the telephone call:
determining that more than one person is present in the vehicle; and
causing an audio recording to be sent to the remote telephone indicating that more than one person is present in the vehicle.

7. The system of claim 6, wherein the operation further comprises:
prior to sending the audio recording:
accepting the telephone call;
muting a microphone and a set of speakers in the vehicle; and
outputting the audio recording for the caller.

8. The system of claim 7, the operation further comprising:
subsequent to outputting the audio recording, unmuting the microphone and the set of speakers in the vehicle.

9. The system of claim 6, wherein the mobile telephone is paired to the audio system via a Bluetooth connection.

10. The system of claim 6, further comprising a microphone connected to the audio system of the vehicle, wherein a speech of the more than one person present in the vehicle is audible to the caller via the microphone, wherein a speech of the caller is audible to the more than one person present in the vehicle via the set of speakers.

11. The system of claim 6, wherein determining that more than one person is present in the vehicle comprises at least one of: (i) determining that more than one person is present in a set of images captured by a camera in the vehicle, (ii) determining that more than one seat belt in the vehicle is fastened, and (iii) determining that a respective weight of more than one seat in the vehicle exceeds a predefined threshold.

12. A computer program product, comprising:
non-transitory computer-readable program code, which when executed by a processor, configures the processor to perform the steps of:
establishing a telephone call between a local mobile telephone and a remote telephone via an audio system in a vehicle, wherein the telephone call is audible through a set of speakers connected to the audio system in the vehicle; and
responsive to the telephone call:
determining that more than one person is present in the vehicle; and
causing an audio recording to be sent to the remote telephone indicating that more than one person is present in the vehicle.

13. The computer program product of claim 12, wherein the audio recording comprises at least one of: (i) a pre-recorded audio recording stored in the audio system, and (ii) an audio recording recorded by a user and stored in the audio system.

14. The computer program product of claim 13, the operation further comprising:
prior to sending the audio recording:
accepting the telephone call;
muting a microphone and a set of speakers in the vehicle; and
outputting the audio recording for the caller.

15. The computer program product of claim 12, wherein determining that more than one person is present in the vehicle comprises at least one of: (i) determining that more than one person is present in a set of images captured by a camera in the vehicle, (ii) determining that more than one seat belt in the vehicle is fastened, and (iii) determining that a respective weight of more than one seat in the vehicle exceeds a predefined threshold.

16. The computer program product of claim 12, wherein the mobile telephone is paired to the audio system via a Bluetooth connection.

17. The computer program product of claim 12, wherein the indication further comprises a photograph at least one of the more than one person in the vehicle.

* * * * *